May 29, 1934.　　　R. B. WOLF ET AL　　　1,960,613
METHOD FOR BLEACHING PAPER PULP
Filed Jan. 13, 1931
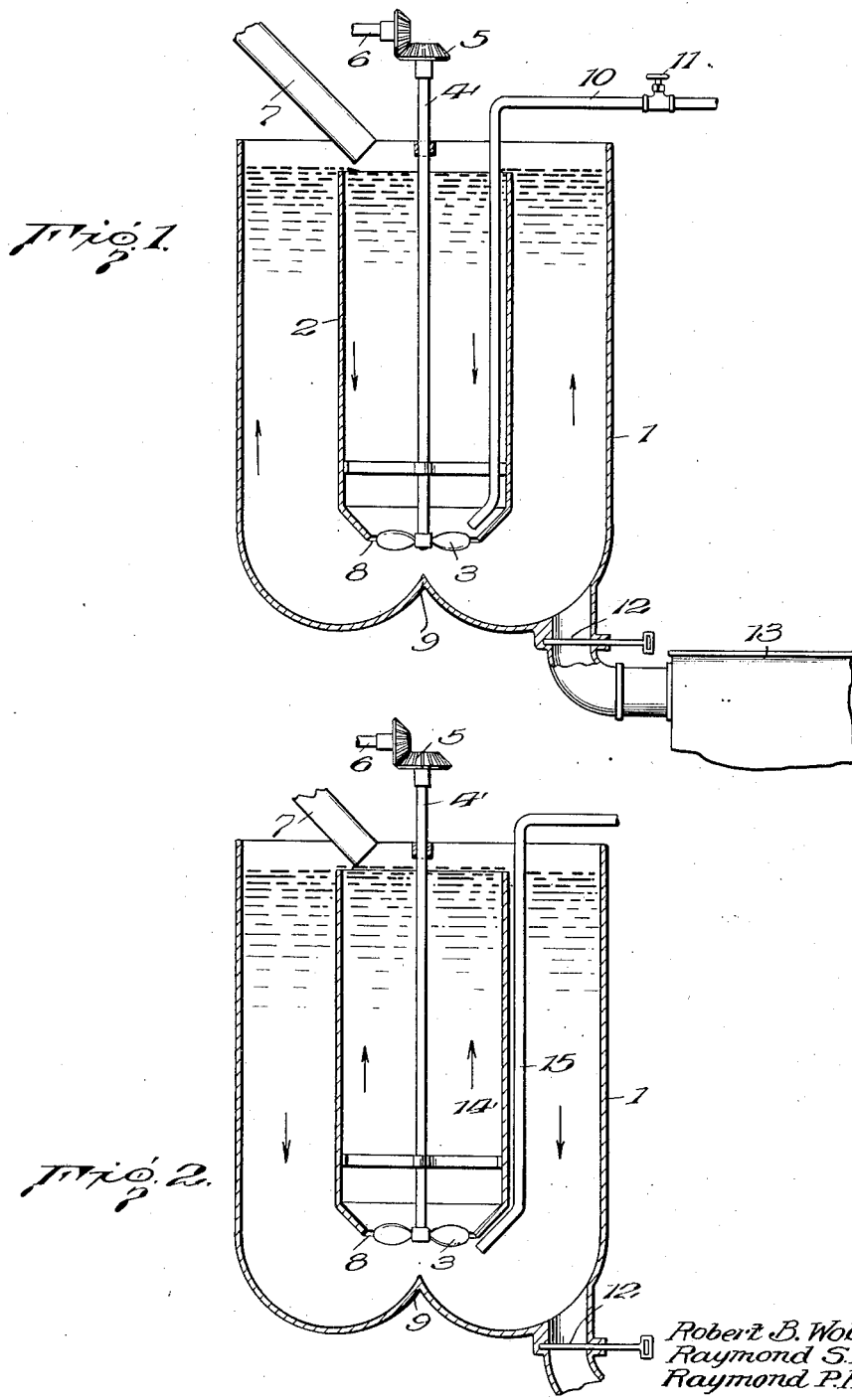
Inventors
Robert B. Wolf
Raymond S. Hatch
Raymond P. Hill,
Attorneys Patented May 29, 1934

1,960,613

UNITED STATES PATENT OFFICE 1,960,613

METHOD FOR BLEACHING PAPER PULP

Robert B. Wolf, New York, N. Y., and Raymond S. Hatch, East Orange, and Raymond P. Hill, Glen Rock, N. J., assignors to International Bleaching Corporation, New York, N. Y., a corporation of Delaware Application January 13, 1931, Serial No. 508,510

3 Claims. (Cl. 8—2)

This invention relates to a method of bleaching cellulosic material with chlorine.

In commercial methods of bleaching cellulosic material and particularly paper pulp, the bleaching agents employed are hypochlorites of the alkali or alkaline earth metals in solution. Such bleaching agents, even in relatively concentrated solutions, are relatively slow in action, and the time required for bleaching is correspondingly extended.

It has been known that chlorine is an effective bleaching agent, but attempts to use chlorine in bleaching paper pulp have not been successful heretofore. Such attempts have failed because the gaseous chlorine introduced to the pulp mass formed bubbles, which either rose rapidly and escaped at the surface of the pulp or became entrained in the mass of fibres and escaped when the pulp during its movement reached the surface. Only a small proportion of the chlorine introduced acted effectively to bleach the pulp, and consequently the method of using chlorine has not been economically practicable.

We have discovered that the difficulties encountered heretofore in the application of chlorine as a bleaching agent for pulp can be overcome and that chlorine is an economical and satisfactory bleaching agent for paper pulp when applied in the manner hereinafter described. Indeed, the use of chlorine affords numerous advantages and among others the rapidity and simplicity of the operation as compared with methods employing hypochlorites. We find, moreover, that pulps which are bleached with difficulty by methods heretofore in use are readily amenable to the chlorine method and that bright strong fibres can be produced thereby in a shorter time and at lower cost than is otherwise possible.

Our method depends upon the hitherto undiscovered principle that the quantity (weight) of chlorine introduced relative to the quantity (weight) of liquid employed should be such that the chlorine is readily and quickly dissolved in the liquid. In the method as hereinafter described, the ratio of the weight of the chlorine introduced to the weight of the water employed as the liquid medium should be such that the chlorine content of the water at the point of introduction of the chlorine never exceeds and preferably does not too closely approach the limit of solubility of about 6.9 grams per liter at 68° F.

The dissolving of the chlorine as it is introduced is facilitated by rapid dissemination in the relatively large proportion of liquid. This can be accomplished in various ways, but we find it most satisfactory to agitate the liquid violently near the point of introduction of the chlorine. Agitation prevents the formation of bubbles of chlorine and the ultimate escape thereof before solution is accomplished. The chlorine is distributed so that it is dissolved readily and completely by the liquid near the point of introduction. The agitation should be conducted in such a way as to ensure the maximum flow of liquid past the point of introduction of the chlorine. Thus fresh liquid is constantly supplied at the point of introduction of the chlorine and the liquid is enabled to dissolve the chlorine as rapidly as it is supplied.

To perform the bleaching function, the pulp must be subjected to the action of the chlorine, and this is effected by suspending the fibres in the water which forms the liquid medium. It is, however, impracticable to secure proper distribution of the chlorine if the pulp is too concentrated. Moreover, as we have indicated, it is essential to have a large proportion of the liquid relatively to the weight of chlorine introduced. The latter factor is determined by the bleaching to be accomplished. Hence we find it desirable to employ concentrations below 4% and preferably not higher than from 2½ to 3%. The use of low concentrations is dictated, moreover, where agitation is employed, owing to the heavy power consumption necessary to agitate effectively a pulp of concentration exceeding 4%. Preferably the concentration should be such that each fibre swims freely in the liquid. Matting of the pulp and the entrapping of bubbles of chlorine is thus avoided.

It will be understood that the encrusting material in the pulp has a strong affinity for the chlorine and the chlorine dissolved in the liquid is consumed rapidly, particularly where the fibres are swimming freely and are thus fully exposed to the action of the chlorine. Consumption of the dissolved chlorine is in fact so rapid that chlorine can be introduced continuously to the liquid during the bleaching operation up to the point where from 60–70% of the desired bleaching is accomplished. The chlorine thus introduced is dissolved as rapidly as it is supplied, and replaces that which reacts with the pulp, and it in turn reacts and is replaced in the solution.

To accomplish the purpose most effectively, the pulp in suspension is preferably circulated continuously from and toward the point at which chlorine is supplied. This circulation ensures the maximum flow of liquid past the point of introduction of the chlorine. Thus the chlorine is dissolved and then reacts as the pulp circulates, the liquid being, upon its return to the point of supply, again sufficiently depleted in chlorine to dissolve an additional amount. Preferably the circulation is quite rapid, as the time required for solution and subsequent depletion of the chlorine is relatively short. Moreover, the rapid circulation ensures the maximum rate of introduction of the chlorine and rapid bleaching of the pulp.

As an example of the invention, we may employ a tank of the capacity of 6000 cubic feet, which will hold approximately 360,000 pounds of water. The pulp is suspended therein in a concentration of preferably from 2½ to 3½%. To this mass we may introduce chlorine, for example, at the rate of 15 pounds per minute. At this rate the chlorine is dissolved immediately if the liquid is subjected to agitation adjacent the point of introduction of the chlorine to prevent the formation of bubbles and to ensure dissemination before the chlorine can rise to the surface of the liquid. In the presence of the fibres the chlorine solution can never attain or even approach, under the conditions mentioned, the condition of saturation, and consequently none of the chlorine can escape. Preferably the mass is circulated at a high rate, for example, the entire mass may be forced past the point of introduction of the chlorine once each minute. The introduction of the chlorine may continue until 60 to 70% of the bleaching is accomplished and may then be discontinued. The circulation continues until the chlorine is exhausted, more chlorine being added, if necessary, to complete the bleaching.

The details of procedure as described and particularly the quantities as specified are merely illustrative of the invention which may be carried out in various forms of apparatus of which two are illustrated in the accompanying drawing, in which Fig. 1 is a diagrammatic view of the apparatus, and Fig. 2 is a diagrammatic view of a slightly modified form of the apparatus.

In the apparatus shown in Fig. 1 of the drawing, 1 indicates a receptacle of suitable size and form to receive a mass of fibres suspended in water which it is desired to bleach with chlorine. The walls of the receptacle should be formed of material suitably resistant to the action of acid which forms during the chlorination of the pulp. Within the receptacle 1 there is provided a vertically disposed degrader 2 in which the pulp is given a downward movement by means of an axial flow impeller 3 secured to a shaft 4 which extends downwardly through the top of the receptacle 1 and which may be driven through suitable gearing 5 from a shaft 6, the latter being rotated by any suitable source of power. While an axial flow impeller is preferred, any other type of impeller which will cause a rapid agitation of the fibrous suspension and will impart the necessary velocity thereto may be used. A mass of pulp preferably of a concentration of between 2½ and 3½% is fed to the receptacle 1 through a launder 7 until the level of the pulp is slightly above the top of the degrader 2. The impeller 3 is then started and the fibrous suspension is forced downwardly and outwardly through the opening 8 in the bottom of the degrader, and a rapid circulation of the fibrous suspension downwardly through the degrader 2 and upwardly along the inside walls of the receptacle 1 on the outside of the degrader is obtained. In order to facilitate and direct the flow of the pulp within the degrader 2 and receptacle 1, the bottom of the receptacle is of a generally round shape and has the center thereof projecting upwardly beneath the center of the impeller 3, as indicated at 9, and gradually curves away from this point in all directions. This causes the flowing stream of pulp to be first deflected outwardly from beneath the impeller and then upwardly along the inside walls of the receptacle.

Chlorine for bleaching the fibrous suspension of pulp is admitted through the pipe 10 controlled by a suitable valve 11. The pipe 10 preferably extends downwardly through the degrader 2 and has its lower end terminating just above the impeller 3. The chlorine injected through the pipe 10 may be either in a gaseous state or else may be in the form of a liquid which will immediately gasify as soon as the pressure is released.

By having the end of the chlorine pipe 10 terminating just above the impeller 3, the stream of chlorine as it emerges from the end of the pipe 10 will be caught by the rapidly moving downward stream of the fibrous suspension and will be immediately carried thereby into contact with the impeller 3, which will effectively break up any large bubbles which might form and will effectively disperse the chlorine throughout the moving mixture.

The circulation of the fibrous suspension downwardly through the degrader 2 and upwardly along the inside walls of the receptacle 1 is continued until the fibres are sufficiently bleached, which will usually require about from sixty to ninety minutes. However, the chlorine need not be injected during this entire period, as the solution will absorb a sufficient amount of chlorine to satisfactorily bleach the fibres in from about twenty to thirty minutes. After that it is only necessary to circulate the fibrous suspension until the absorbed chlorine has been exhausted. After the bleaching is completed the pulp may be discharged through a valve controlled outlet 12 into a chest 13.

As long as a sufficient quantity of water relative to the quantity of chlorine to be introduced is employed, the chlorine is dissolved quickly, and the fibres in intimate contact with the solution absorb the chlorine therefrom. The solution then passes downwardly through the degrader 2 and is in a condition to take up more chlorine as it is carried past the point of injection and again give up the chlorine to the fibres. As the chlorine has to be injected at a certain definite rate in order to get a sufficient amount into the fibres in a short enough period of time, to render the operation commercially practical, the amount of the suspension passing the point of injection should be as large as possible.

The apparatus above described is the type preferred, as in addition to permitting the chlorine to be injected at a point where the fibrous suspension is undergoing agitation and traveling at high velocity, it causes a downward flow of the suspension at the place where the chlorine is injected. While this is desirable and is to be preferred in most cases, it is not absolutely essential, as with sufficient agitation at the point of injection the chlorine may be dispersed throughout and sufficient amounts taken up by the fibres and exhausted even when the flow of the suspension is concurrent with the natural course of the bubbles in rising to the surface. Such an apparatus is shown in Fig. 2 where the structure of the receptacle 1, elevator 14 and impeller 3 is the same as the receptacle 1, degrader 2 and impeller 3 of Fig. 1. However, in this figure the chlorine pipe 15 extends downwardly within the receptacle 1 and terminates beneath the impeller 3. Also in this modification the impeller is driven in the reverse direction so that the fibrous suspension circulates downwardly within the receptacle 1 and then upwardly through the elevator 14.

Regardless of which form of apparatus is utilized the fibres should be more or less freely swimming in the water and the mixture should be agitated and moving at high velocity at the point where the chlorine is injected. This will ensure the fibres absorbing and exhausting a sufficient amount of chlorine in a relatively short period of time and will prevent any noticeable amounts of the chlorine from escaping into the atmosphere.

The bleaching as carried out according to the method heretofore described has been found admirably suited as the first stage of a multi-stage bleaching operation or the last stage, although its use is not so limited. Therefore, when the appended claims refer to a method of bleaching it will be understood that this method may or may not comprise the sole bleaching operation to which the fibrous material is subjected.

We claim:

1. The method of bleaching paper pulp which comprises cyclicly circulating a liquid stream of a suspension of fibre downwardly and then upwardly at a velocity sufficiently high to overcome the natural tendency of chlorine bubbles to rise therethrough and injecting chlorine into the downwardly moving stream of the suspension.

2. The method of bleaching paper pulp which comprises cyclicly circulating a liquid stream of a suspension of fibre in which the percentage of fibre does not exceed 4% downwardly and then upwardly at a velocity sufficiently high to overcome the natural tendency of chlorine bubbles to rise therethrough and injecting chlorine into the downwardly moving stream of the suspension.

3. The method of bleaching paper pulp, which comprises cyclicly circulating a liquid stream of a suspension of fiber downwardly and then upwardly at a velocity sufficiently high to overcome the natural tendency of chlorine bubbles to rise therethrough, agitating said fibrous suspension at a point adjacent the change in direction of travel from downward to upward, and injecting chlorine into the downwardly moving stream adjacent the zone of agitation.

ROBERT B. WOLF.
RAYMOND S. HATCH.
RAYMOND P. HILL.